United States Patent [19]
Gillespie

[11] Patent Number: 5,257,607
[45] Date of Patent: Nov. 2, 1993

[54] FUEL INJECTED, TWO-STROKE INTERNAL COMBUSTION ENGINE

[75] Inventor: George T. Gillespie, Franklin, Wis.
[73] Assignee: Outboard Marine Corporation, Waukegan, Ill.
[21] Appl. No.: 965,736
[22] Filed: Oct. 23, 1992
[51] Int. Cl.$^5$ ............................................. F02D 41/04
[52] U.S. Cl. ................................... 123/478; 123/73 C
[58] Field of Search ............... 123/73 A, 73 C, 478, 123/494; 73/118.2

[56] References Cited

U.S. PATENT DOCUMENTS

| | | | |
|---|---|---|---|
| 4,750,464 | 6/1988 | Staerzl | 123/494 |
| 4,763,626 | 8/1988 | Staerzl | 123/438 |
| 4,768,474 | 9/1988 | Fujimoto et al. | 123/73 B |
| 4,840,148 | 6/1989 | Staerzl | 123/73 A |
| 4,920,790 | 5/1990 | Stiles et al. | 73/118.2 |
| 4,932,371 | 6/1990 | Albertson et al. | 123/73 SP |
| 4,955,341 | 9/1990 | Trombley et al. | 123/73 C |
| 4,958,516 | 9/1990 | Stiles et al. | 73/118.2 |
| 4,958,609 | 9/1990 | Trombley et al. | 123/478 |
| 4,967,712 | 11/1990 | Chasteen | 123/478 |
| 4,987,773 | 1/1991 | Stiles et al. | 73/118.2 |
| 4,993,225 | 2/1991 | Giacomazzi et al. | 60/283 |
| 5,134,984 | 8/1992 | Nonaka et al. | 123/494 |
| 5,146,899 | 9/1992 | Tanaka et al. | 123/478 X |
| 5,191,531 | 3/1993 | Kurosu et al. | 123/478 X |

FOREIGN PATENT DOCUMENTS

| | | |
|---|---|---|
| 57-32059 | 2/1982 | Japan. |
| 60-3448 | 1/1985 | Japan. |
| 60-32952 | 2/1985 | Japan. |
| 1-280660 | 11/1989 | Japan. |
| 1-280661 | 11/1989 | Japan. |
| 1-280662 | 11/1989 | Japan. |

Primary Examiner—Willis R. Wolfe
Attorney, Agent, or Firm—Michael, Best & Friedrich

[57] ABSTRACT

A two-stroke internal combustion engine comprising a combustion chamber, a fuel injector for injecting fuel into the combustion chamber, an intake passage communicating with the combustion chamber, the intake passage including a venturi section, a throttle in the intake passage, and an engine control for sensing the pressure $P_V$ in the venturi section during engine operation, for sensing throttle position TP, for determining, in response to TP, a specific amount of fuel to be injected by the fuel injector, and for modifying the specific amount of fuel in response to $P_V$.

22 Claims, 2 Drawing Sheets

FUEL INJECTED, TWO-STROKE INTERNAL COMBUSTION ENGINE

BACKGROUND OF THE INVENTION

The invention relates to internal combustion engines, and more particularly to fuel-injected, two-stroke internal combustion engines.

It is known to use different inputs to control a fuel-injected, two-stroke engine at high and low engine speeds. In an engine operating with stratified combustion under part-load conditions, there is always excess air available to combine with the injected fuel. Engine power can therefore be controlled simply by varying the amount of fuel injected as a function of engine speed and throttle position. As a result, it is not necessary to determine with a high degree of accuracy the engine air flow at part load. However, as the load approaches wide open throttle and the combustion becomes less stratified, it is desirable to control engine power by varying the amount of fuel injected as a function of mass air flow. See, for example, U.S. Pat. No. 4,932,371.

U.S. Pat. No. 4,932,371 teaches that mass air flow can be derived either with a conventional mass air flow sensor within the intake manifold or by computer processing of a pressure signal produced by a pressure sensor within the crankcase. While the use of a conventional mass air flow sensor may be practical in an automotive application, it is not practical in a marine application. Water adversely affects the accuracy of a mass air flow sensor. It is therefore impractical to use mass air flow as the primary input for controlling the engine of an outboard motor.

U.S. Pat. No. 4,750,464 discloses a fuel injection system in which mass air flow is used to control the amount of fuel injected at all engine speeds. The amount of air coming into the engine is determined from the velocity and mass of the air. Velocity is determined by sensing the pressure drop across a venturi in the air intake manifold, and mass is measured by sensing air pressure and temperature. No throttle position sensor is used.

SUMMARY OF THE INVENTION

The invention provides an engine with a venturi in the intake passage, and the pressure drop in the venturi is used as a secondary input for controlling the engine at high loads. Engine speed and throttle position are the primary inputs at both high and low loads. At high loads, the pressure drop of the engine is compared to the pressure drop (at the same engine speed and throttle position) of a test or master engine, and the fuel injection amount (or another engine characteristic) is adjusted accordingly.

More particularly, the invention provides a two-stroke internal combustion engine comprising means defining a combustion chamber, means for injecting fuel into the combustion chamber, means defining an intake passage communicating with the combustion chamber, the intake passage including a venturi section, throttle means in the intake passage, and engine control means including means for sensing the pressure $P_V$ in the venturi section during engine operation, means for sensing throttle position TP, means for determining, in response to TP, a specific amount of fuel to be injected by the injection means, and means for modifying the specific amount of fuel in response to $P_V$.

One embodiment of the invention provides a two-stroke internal combustion engine comprising means defining a combustion chamber, means for injecting fuel into the combustion chamber, means defining an intake passage communicating with the combustion chamber, the intake passage including a venturi section, throttle means in the intake passage, and engine control means including a pressure sensor communicating with the venturi section, means including the sensor for sensing the pressure $P_V$ in the venturi section during engine operation, means including the sensor for sensing atmospheric pressure $P_A$ at start-up of the engine, and means for calculating the pressure drop $\Delta P_E = P_A - P_V$.

One embodiment of the invention provides a two-stroke internal combustion engine comprising means defining a combustion chamber, means for injecting fuel into the combustion chamber, means defining an intake passage communicating with the combustion chamber, the intake passage including a venturi section, throttle means in the intake passage, and engine control means including means for sensing the pressure $P_V$ in the venturi section during engine operation, means for sensing atmospheric pressure $P_A$, means for calculating the pressure drop $\Delta P_E = P_A - P_V$, and means for comparing $\Delta P_E$ to the pressure drop $\Delta P_T$ for a test engine.

One embodiment of the invention provides an outboard motor comprising a lower unit adapted to be mounted on the transom of a boat, the lower unit including a propeller shaft, and a two-stroke internal combustion engine mounted on the lower unit and drivingly connected to the propeller shaft, the engine including means defining a combustion chamber, means for injecting fuel into the combustion chamber, means defining an intake passage communicating with the combustion chamber, the intake passage including a venturi section, throttle means in the intake passage and downstream of the venturi section, the throttle means being operable through a range of positions including idle, wide open throttle, and an intermediate position between idle and wide open throttle, and engine control means including means for sensing engine speed RPM, means for sensing throttle position TP, means for sensing the pressure $P_V$ in the venturi section during engine operation, means for sensing atmospheric pressure $P_A$, means for calculating the pressure drop $\Delta P_E = P_A - P_V$, means for comparing $\Delta P_E$ to the pressure drop $\Delta P_T$ for a test engine, the comparing means including means for providing a map of $\Delta P_T$ as a function of RPM and TP, and means for comparing $\Delta P_E$ to $\Delta P_T$ on the map, means for determining, in response to TP and RPM, a specific amount of fuel to be injected by the injecting means, and means operable only when the position of the throttle means is between the intermediate position and wide open throttle for modifying the specific amount of fuel in response to the difference between $\Delta P_E$ and $\Delta P_T$, the modifying means reducing the amount of fuel if $\Delta P_E$ is less than $\Delta P_T$ and increasing the amount of fuel if $\Delta P_E$ is greater than $\Delta P_T$.

A principal feature of the invention is the provision of a fuel-injected engine including a venturi in the intake passage, a sensor for measuring the pressure drop in the venturi, and a control system that compares the pressure drop to that of a test engine and then adjusts fuel injection at high loads. This control system accounts for differences in engines due to production tolerances and due to wear and tear. The engine does not require a mass air flow sensor, which is not practical in some applications.

Other features and advantages of the invention will become apparent to those skilled in the art upon review of the following detailed description, claims and drawings.

Figure 1:
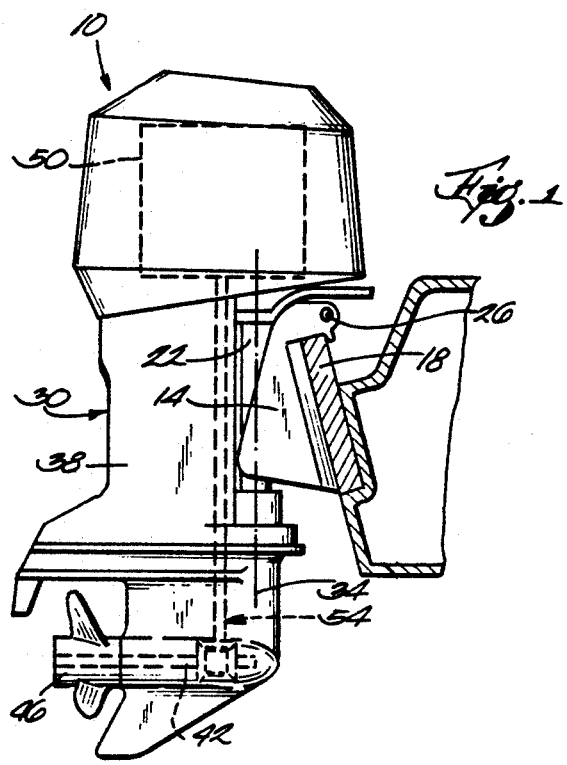
FIG. 1 is a side elevational view of an outboard motor embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine propulsion device embodying the invention is illustrated in the drawings. As shown in FIG. 1, the illustrated marine propulsion device is an outboard motor 10 comprising a mounting bracket 14 fixedly mounted on the transom 18 of a boat. The outboard motor 10 also comprises a swivel bracket 22 supported by the mounting bracket 14 for pivotal movement relative thereto about a generally horizontal tilt axis 26, and a propulsion unit 30 supported by the swivel bracket 22 for pivotal movement relative thereto about a generally vertical steering axis 34. The propulsion unit 30 comprises a lower unit 38 including a propeller shaft 42 having thereon a propeller 46. The propulsion unit 30 also comprises an internal combustion engine 50 mounted on the lower unit 38 and drivingly connected to the propeller shaft 42 via a conventional drive train 54.

The engine 50 is preferably a two-stroke engine having one or more cylinders. A single cylinder 58 is shown schematically in FIG. 2. The engine 50 includes an engine block 62 defining the cylinder 58. The engine 50 also includes a crankcase cover 66 which is mounted on the engine block 62 and which cooperates with the engine block 62 to define a crankcase 70. A crankshaft 74 is rotatably supported either by the engine block 62 or by the engine block 62 and the crankcase cover 66. A piston 78 is slideably housed in the cylinder 58 and is connected to the crankshaft 74 via a crank arm 82 such that the piston 78 reciprocates in the cylinder 58 in response to rotation of the crankshaft 74. The engine 50 also includes a cylinder head 86 which is mounted on the engine block 62 and which cooperates with the piston 78 and the engine block 62 to define a combustion chamber 90 between the piston 78 and the cylinder head 86.

An intake manifold 94 is mounted on the crankcase cover 66 and includes an intake passage 98 communicating with the crankcase 70 via a conventional reed valve 102. Because the crankcase 70 communicates with the combustion chamber 90 via one or more intake passages (not shown), the intake passage 98 communicates with the combustion chamber 90. The intake passage 98 includes a venturi section 106. The remainder of the intake passage 98 has a substantially uniform inside diameter. Preferably, the inside diameter of the venturi section 106 is approximately 80% of the inside diameter of the remainder of the intake passage 98. For example, for a 3.0 liter engine, if the inside diameter of the main portion of the intake passage 98 is 100 mm, then the inside diameter of the venturi section 106 is 80 mm. This relationship is important. The reduction in diameter at the venturi section must be great enough to produce a measurable pressure drop (for reasons explained below), but must not be so great as to adversely affect engine performance.

The engine 50 also includes throttle means 110 which is located in the intake passage 98 downstream of the venturi section 106. The throttle means 110 includes a throttle plate 114 pivotally mounted within the intake passage 98. A throttle control linkage 118 pivots the throttle plate 114 in response to input from an operator control member (not shown), such as a remote control lever in the boat. Any suitable throttle control linkage can be employed. The preferred linkage is disclosed in U.S. patent application Ser. No. 07/954,492, filed Sept. 30, 1992, now pending, which is titled "THROTTLE LEVER POSITION SENSOR FOR TWO-STROKE FUEL INJECTED ENGINE," which is assigned to the assignee hereof, and which is incorporated herein by reference. As is known in the art, the throttle means 110 is operable through a range of positions including idle, wide open throttle, and an intermediate position between idle and wide open throttle. The significance of the intermediate position is explained below. In the preferred embodiment of the invention, the throttle plate 114 is approximately 75% open in the intermediate position.

The engine 50 also includes means for injecting fuel into the combustion chamber 90. While various suitable means can be employed, in the illustrated embodiment, such means includes a fuel injector 122 having a nozzle 126 communicating with the combustion chamber 90, a fuel source 130, and a pump 134 for supplying fuel under pressure from the fuel source 130 to the fuel injector 122. The engine 50 also includes a conventional spark plug 138, and an ignition coil 142 for providing current to the spark plug 138.

Figure 2:
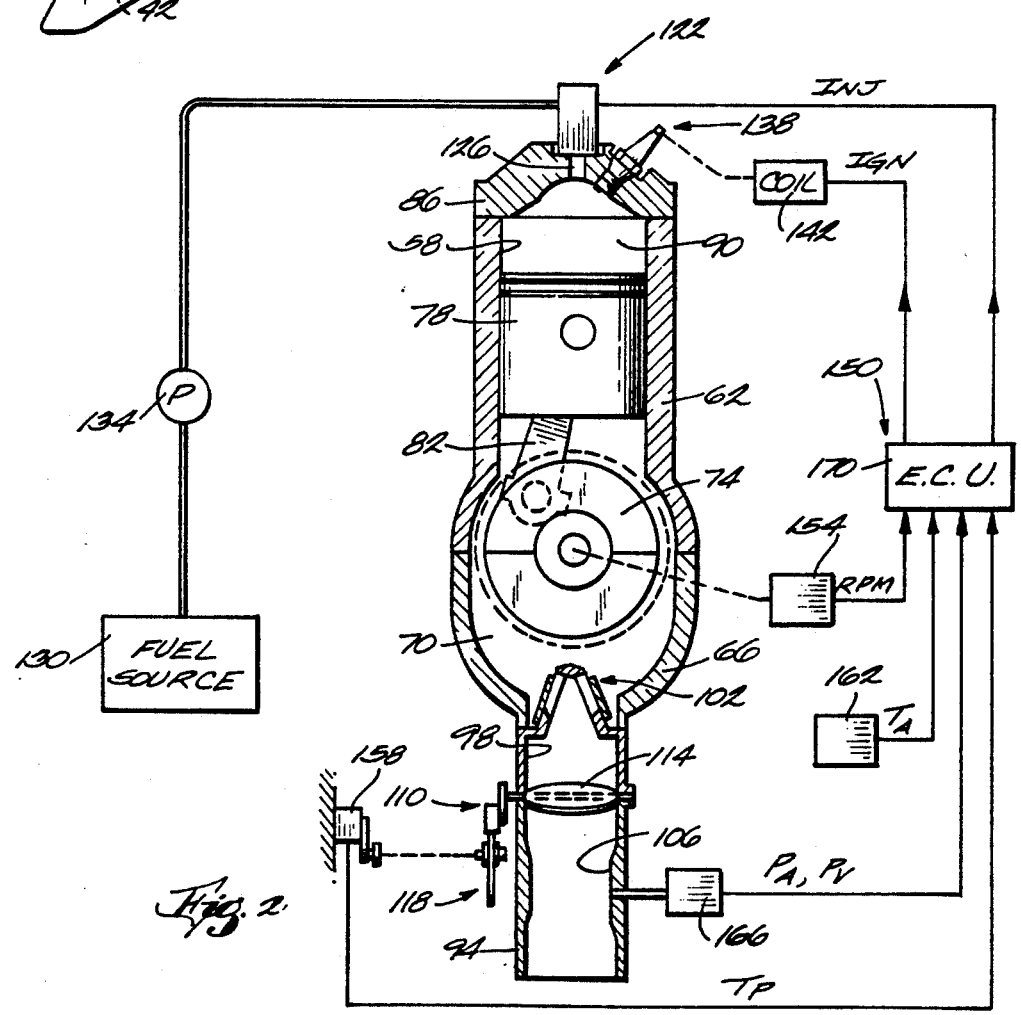
FIG. 2 is a schematic view of the engine of the outboard motor.

The engine 50 also includes engine control means 150 which is illustrated schematically in FIG. 2. The engine control means 150 includes means for sensing engine speed RPM. This means is preferably a conventional sensor 154 for detecting the rotational speed of the crankshaft 74. The control means 150 also includes means for sensing throttle position TP. This means includes a throttle position sensor 158, and preferably includes the throttle position sensor arrangement disclosed in the above-mentioned application titled "THROTTLE LEVER POSITION SENSOR FOR TWO-STROKE FUEL INJECTED ENGINE." The control means 150 also includes means for sensing atmospheric temperature $T_A$. Any suitable temperature sensor 162 can be employed.

The control means 150 also includes means for sensing atmospheric pressure $P_A$ at engine start-up, and means for sensing the air pressure $P_V$ in the venturi section 106 during engine operation. While various suitable pressure sensing means can be employed, in the illustrated embodiment, both of these means include a single air pressure sensor 166 communicating with the venturi section 106.

The engine control means 150 further includes an electronic control unit 170 operably connected to the throttle position sensor 158, the pressure sensor 166, the temperature sensor 162, the engine speed sensor 154, the ignition coil 142, and the fuel injector 122. The outputs of the throttle position sensor 158, the pressure sensor 166, the temperature sensor 162, and the engine speed sensor 154 are received by the electronic control unit 170. In response to the input signals provided by the sensors 158, 162, 166 and 154, the electronic control unit 170 sends a signal IGN to the ignition coil 142 to control firing of the spark plug 138, and the electronic control unit 170 sends a signal INJ to the fuel injector 122 to control the amount of fuel injected into the combustion chamber.

Figure 3:
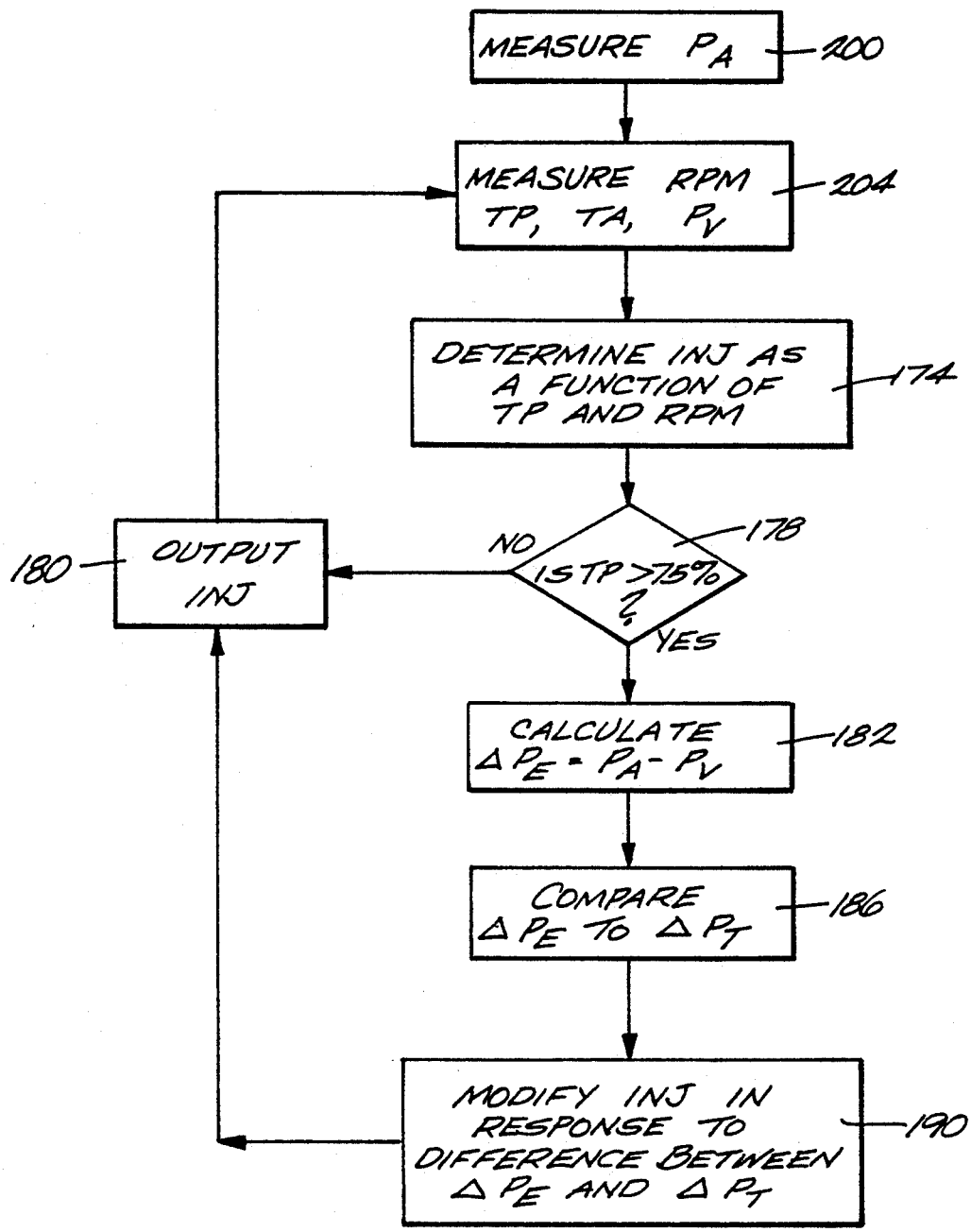
FIG. 3 is a flow chart illustrating the operation of the electronic control unit of the engine.

The logic of the electronic control unit 170 is shown in a flow chart in FIG. 3. The electronic control unit 170 includes (see Step 174 in FIG. 3) means for determining, in response to TP and RPM, a specific amount of fuel to be injected by the fuel injector 122 during each operating cycle of the engine. Such means is well known in the art and will not be described in greater detail. If desired, atmospheric temperature $T_A$ and atmospheric pressure $P_A$ can also be used as inputs for determining the specific amount of fuel to be injected.

The electronic control unit 170 also includes (see Steps 178, 182, 186 and 190 in FIG. 3) means operable only when the throttle position is between the intermediate position and wide open throttle for modifying, in response to $P_V$, the specific amount of fuel to be injected by the fuel injector 122. More particularly, when the throttle is between 75% and wide open, the electronic control unit 170 uses $P_V$ to calculate the pressure drop $\Delta P_E$ in the venturi section 106, which pressure drop is the difference between $P_A$ at engine start-up and $P_V$ during engine operation. The control unit 170 then uses $\Delta P_E$ as a secondary input for modifying the specific amount of fuel to be injected by the fuel injector 122.

Accordingly, the means for modifying the specific amount of fuel injected includes (see Step 182 in FIG. 3) means for calculating the pressure drop $\Delta P_E = P_A - P_V$. The means for modifying the specific amount of fuel injected also includes (see Step 186 in FIG. 3) means for comparing $\Delta P_E$ to the pressure drop $\Delta P_T$ for a test engine. Specifically, the electronic control unit 170 includes a map of $\Delta P_T$ as a function of RPM and TP of the test engine, and the electronic control unit 170 compares $\Delta P_E$ for a given TP value and a given RPM value to the mapped $\Delta P_T$ for the same TP and RPM values. To determine the actual amount of fuel to be injected, the means for modifying the previously-determined specific amount of fuel further includes (see Step 190 in FIG. 3) means for varying the specific amount of fuel in response to the calculated difference between $\Delta P_E$ and $\Delta P_T$. The specific amount of fuel is reduced if $\Delta P_E$ is less than $\Delta P_T$ and is increased if $\Delta P_E$ is greater than $\Delta P_T$. The degree to which the amount of fuel injected is reduced or increased in response to a given variation between $\Delta P_E$ and $\Delta P_T$ can be determined experimentally for any given model of engine.

The electronic control unit 170 operates as follows. First, at Step 200 (see FIG. 3), the electronic control unit 170 reads the input signal from the pressure sensor 166 at engine start-up to determine atmospheric pressure $P_A$. Next, at Step 204, the electronic control unit 170 reads the input from the throttle position sensor 158, the pressure sensor 166, the temperature sensor 162 and the engine speed sensor 154 during engine operation to determine throttle position TP, venturi pressure $P_V$, atmospheric temperature $T_A$ and engine speed RPM. Next, at Step 174, the electronic control unit 170 determines a specific amount of fuel to be injected (INJ) in response to TP and RPM. $T_A$ and $P_A$ can be used as secondary inputs.

Next, at Step 178, the electronic control unit 170 asks whether TP is greater than 75%. In other words, the electronic control unit 170 determines whether the throttle position is between the intermediate position and wide open throttle. If the answer is "no," the electronic control unit 170 proceeds to Step 180, at which the electronic control unit outputs INJ in accordance with Step 174. After Step 180, the control unit returns to Step 204. If the answer at Step 178 is "yes," the electronic control unit 170 proceeds to Step 182.

At Step 182, the electronic control unit 170 calculates $\Delta P_E = P_A - P_V$. Next, at Step 186, the electronic control unit 170 compares the calculated value $\Delta P_E$ to the mapped $\Delta P_T$ for the TP and RPM determined at Step 204. Next, at Step 190, the electronic control unit 170 varies the amount of fuel injected (INJ) in response to the difference between $\Delta P_E$ and $\Delta P_T$. As explained above, the electronic control unit 170 reduces the amount of fuel injected if $\Delta P_E$ is less than $\Delta P_T$ and increases the amount of fuel injected if $\Delta P_E$ is greater than $\Delta P_T$. After Step 190, the electronic control unit 170 proceeds to Step 204.

Thus, when throttle position is between idle and 75%, TP and RPM are used as the primary inputs for controlling the amount of fuel injected. The pressure drop $\Delta P_E$ in the venturi section 106 is not used as an input when throttle position is less than 75%. When throttle position exceeds 75%, engine speed RPM and throttle position TP are still used as primary inputs for determining the amount of fuel to be injected, but the pressure drop $\Delta P_E$ is used as a secondary input for modifying the amount of fuel to be injected. As explained above, as engine load approaches wide open throttle and combustion becomes less stratified, it is desirable to vary the amount of fuel injected as a function of mass air flow. The electronic control unit 170 uses $\Delta P_E$ in conjunction with $T_A$ and $P_A$ as an indirect indication of mass air flow and accordingly modifies the amount of fuel to be injected.

Various features of the invention are set forth in the following claims.

I claim:

1. A two-stroke internal combustion engine comprising means defining a combustion chamber, means for injecting fuel into said combustion chamber, means defining an intake passage communicating with said combustion chamber, said intake passage including a venturi section, throttle means in said intake passage, and engine control means including means for sensing the pressure $P_V$ in said venturi section during engine operation, means for sensing throttle position TP, means for determining, in response to TP, a specific amount of fuel to be injected by said injection means, and means for modifying said specific amount of fuel in response to $P_V$.

2. A two-stroke internal combustion engine comprising means defining a combustion chamber, means for injecting fuel into said combustion chamber, means defining an intake passage communicating with said combustion chamber, said intake passage including a venturi section, throttle means in said intake passage, and engine control means including means for sensing the pressure $P_V$ in said venturi section during engine operation, means for sensing throttle position TP, means for determining, in response to TP, a specific amount of fuel to be injected by said injection means, means for modifying said specific amount of fuel in response to $R_v$, and means for sensing atmospheric pressure $P_A$, said modifying means including means for calculating the pressure drop $\Delta P_v = P_A - P_v$.

3. An engine as set forth in claim 2 and further comprising a pressure sensor communicating with said venturi section, wherein said means for sensing $P_A$ and said means for sensing $P_V$ both include said sensor, and wherein $P_A$ is sensed at engine start-up.

4. An engine as set forth in claim 2 wherein said modifying means also includes means for comparing $\Delta P_E$ to the pressure drop $\Delta P_T$ for a test engine.

5. An engine as set forth in claim 4 wherein said control means also includes means for sensing engine speed RPM, and wherein said comparing means includes means for providing a map of $\Delta P_T$ as a function of RPM and TP, and means for comparing $\Delta P_E$ to $\Delta P_T$ on said map.

6. An engine as set forth in claim 5 wherein said modifying means further includes means for varying said specific amount of fuel in response to the difference between $\Delta P_E$ and $\Delta P_T$.

7. An engine as set forth in claim 6 wherein said varying means reduces said amount of fuel if $\Delta P_E$ is less than $\Delta P_T$ and increases said amount of fuel if $\Delta P_E$ is greater than $\Delta P_T$.

8. A two-stroke internal combustion engine comprising means defining a combustion chamber, means for injecting fuel into said combustion chamber, means defining an intake passage communicating with said combustion chamber, said intake passage including a venturi section, throttle means in said intake passage, said throttle means being operable through a range of positions including idle, wide open throttle, and an intermediate position between idle and wide open throttle, and engine control means including means for sensing the pressure $R_v$ in said venturi section during engine operation, means for sensing throttle position TP, means for determining, in response to TP, a specific amount of fuel to be injected by said injection means, and means for modifying said specific amount of fuel in response to $P_v$, said modifying means being operable only when the position of said throttle means is between said intermediate position and wide open throttle.

9. An engine as set forth in claim 1 wherein said determining means determines said specific amount of fuel in response to RPM and TP.

10. A two-stroke internal combustion engine comprising means defining a combustion chamber, means for injecting fuel into said combustion chamber, means defining an intake passage communicating with said combustion chamber, said intake passage including a venturi section, throttle means in said intake passage, and engine control means including a pressure sensor communicating with said venturi section, means including said sensor for sensing the pressure $P_V$ in said venturi section during engine operation, means including said sensor for sensing atmospheric pressure $P_A$ at start-up of said engine, and means for calculating the pressure drop $\Delta P_E = P_A - P_V$.

11. An engine as set forth in claim 10 and wherein said engine control means further includes means for comparing $\Delta P_E$ to the pressure drop $\Delta P_T$ for a test engine.

12. An engine as set forth in claim 11 wherein said control means also includes means for sensing engine speed RPM and throttle position TP, and wherein said comparing means includes means for providing a map of $\Delta P_T$ as a function of RPM and TP, and means for comparing $\Delta P_E$ to $\Delta P_T$ on said map.

13. An engine as set forth in claim 12 wherein said engine control means further includes means for determining, in response to TP, a specific amount of fuel to be injected by said injection means, and means for modifying said specific amount of fuel in response to the difference between $\Delta P_E$ and $\Delta P_T$.

14. An engine as set forth in claim 13 wherein said modifying means reduces said amount of fuel if $\Delta P_E$ is less than $\Delta P_T$ and increases said amount of fuel if $\Delta P_E$ is greater than $\Delta P_T$.

15. An engine as set forth in claim 13 wherein said throttle means is operable through a range of positions including idle, wide open throttle, and an intermediate position between idle and wide open throttle, and wherein said modifying means is operable only when the position of said throttle means is between said intermediate position and wide open throttle.

16. A two-stroke internal combustion engine comprising means defining a combustion chamber, means for injecting fuel into said combustion chamber, means defining an intake passage communicating with said combustion chamber, said intake passage including a venturi section, throttle means in said intake passage, and engine control means including means for sensing the pressure $P_V$ in said venturi section during engine operation, means for sensing atmospheric pressure $P_A$, means for calculating the pressure drop $\Delta P_E = P_A - P_V$, and means for comparing $\Delta P_E$ to the pressure drop $\Delta P_T$ for a test engine.

17. An engine as set forth in claim 16 and further comprising a pressure sensor communicating with said venturi section, wherein said means for sensing $P_A$ and said means for sensing $P_V$ both include said sensor, and wherein $P_A$ is sensed at engine start-up.

18. An engine as set forth in claim 17 wherein said control means also includes means for sensing engine speed RPM and throttle position TP, and wherein said comparing means includes means for providing a map of $\Delta P_T$ as a function of RPM and TP, and means for comparing $\Delta P_E$ to $\Delta P_T$ on said map.

19. An engine as set forth in claim 18 wherein engine control means further includes means for determining, in response to TP, a specific amount of fuel to be injected by said injection means, and means for modifying said specific amount of fuel in response to the difference between $\Delta P_E$ and $\Delta P_T$.

20. An engine as set forth in claim 19 wherein said modifying means reduces said amount of fuel if $\Delta P_E$ is less than $\Delta P_T$ and increases said amount of fuel if $\Delta P_E$ is greater than $\Delta P_T$.

21. An engine as set forth in claim 19 wherein said throttle means is operable through a range of positions including idle, wide open throttle, and an intermediate position between idle and wide open throttle, and wherein said modifying means is operable only when the position of said throttle means is between said intermediate position and wide open throttle.

22. An outboard motor comprising a lower unit adapted to be mounted on the transom of a boat, said lower unit including a propeller shaft, and a two-stroke internal combustion engine mounted on said lower unit and drivingly connected to said propeller shaft, said engine including means defining a combustion chamber, means for injecting fuel into said combustion chamber, means defining an intake passage communicating with said combustion chamber, said intake passage including a venturi section, throttle means in said intake passage and downstream of said venturi section, said throttle means being operable through a range of positions including idle, wide open throttle, and an intermediate position between idle and wide open throttle, and engine control means including means for sensing engine speed RPM, means for sensing throttle position TP, means for sensing the pressure $P_V$ in said venturi section during engine operation, means for sensing atmospheric pressure $P_A$, means for calculating the pressure drop $\Delta P_E = P_A - P_V$, means for comparing $\Delta P_E$ to the pressure drop $\Delta P_T$ for a test engine, said comparing means including means for providing a map of $\Delta P_T$ as a function of RPM and TP, and means for comparing $\Delta P_E$ to $\Delta P_T$ on said map, means for determining, in response to TP and RPM, a specific amount of fuel to be injected by said injecting means, and means operable only when the position of said throttle means is between said intermediate position and wide open throttle for modifying said specific amount of fuel in response to the difference between $\Delta P_E$ and $\Delta P_T$, said modifying means reducing said amount of fuel if $\Delta P_E$ is less than $\Delta P_T$ and increasing said amount of fuel if $\Delta P_E$ is greater than $\Delta P_T$.

* * * * *